US007957565B1

(12) United States Patent
Sharma et al.

(10) Patent No.: US 7,957,565 B1
(45) Date of Patent: Jun. 7, 2011

(54) METHOD AND SYSTEM FOR RECOGNIZING EMPLOYEES IN A PHYSICAL SPACE BASED ON AUTOMATIC BEHAVIOR ANALYSIS

(75) Inventors: Rajeev Sharma, State College, PA (US); Satish Mummareddy, Washington, DC (US); Jeff Hershey, Norfolk, VA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 740 days.

(21) Appl. No.: 12/079,901

(22) Filed: Mar. 28, 2008

Related U.S. Application Data

(60) Provisional application No. 60/921,890, filed on Apr. 5, 2007.

(51) Int. Cl.
*G06K 9/00* (2006.01)
(52) U.S. Cl. .................................. 382/115; 382/103
(58) Field of Classification Search .................. None
See application file for complete search history.

(56) References Cited

U.S. PATENT DOCUMENTS

| | | | | | |
|---|---|---|---|---|---|
| 5,097,328 | A | * | 3/1992 | Boyette | 348/150 |
| 5,465,115 | A | * | 11/1995 | Conrad et al. | 348/155 |
| 5,923,365 | A | * | 7/1999 | Tamir et al. | 348/169 |
| 6,441,734 | B1 | * | 8/2002 | Gutta et al. | 340/541 |
| 6,654,047 | B2 | * | 11/2003 | Iizaka | 348/143 |
| 6,967,674 | B1 | * | 11/2005 | Lausch | 348/143 |
| 7,068,842 | B2 | * | 6/2006 | Liang et al. | 382/181 |
| 7,088,846 | B2 | * | 8/2006 | Han et al. | 382/103 |
| 7,136,507 | B2 | * | 11/2006 | Han et al. | 382/103 |
| 7,903,141 | B1 | * | 3/2011 | Mariano et al. | 348/143 |
| 2002/0135484 | A1 | * | 9/2002 | Ciccolo et al. | 340/573.1 |
| 2003/0002712 | A1 | | 1/2003 | Steenburgh et al. | |
| 2003/0048926 | A1 | * | 3/2003 | Watanabe | 382/103 |
| 2003/0053659 | A1 | | 3/2003 | Pavlidis et al. | |
| 2003/0058339 | A1 | | 3/2003 | Trajkovic et al. | |
| 2003/0107649 | A1 | * | 6/2003 | Flickner et al. | 348/150 |
| 2003/0179294 | A1 | * | 9/2003 | Martins | 348/157 |
| 2004/0120581 | A1 | | 6/2004 | Ozer et al. | |
| 2004/0131254 | A1 | * | 7/2004 | Liang et al. | 382/181 |
| 2005/0119048 | A1 | * | 6/2005 | Soltys et al. | 463/29 |
| 2005/0157169 | A1 | * | 7/2005 | Brodsky et al. | 348/143 |

(Continued)

OTHER PUBLICATIONS

U.S. Appl. No. 60/846,014, Shama, et al.

(Continued)

*Primary Examiner* — Brian P Werner

(57) ABSTRACT

The present invention is a method and system for recognizing employees among the people in a physical space based on automatic behavior analysis of the people in a preferred embodiment. The present invention captures a plurality of input images of the people in the physical space by a plurality of means for capturing images. The present invention processes the plurality of input images in order to understand the behavioral characteristics of the people for the employee recognition purpose. The behavior analysis can comprise a path analysis as one of the characterization methods. The path analysis collects a plurality of trip information for each tracked person during a predefined window of time. The trip information can comprise spatial and temporal attributes, such as coordinates of the person's position, trip time, trip length, and average velocity for each of the plurality of trips. Based on the employee recognition criteria applied to the trip information, the present invention distinguishes employees from non-employees during a predefined window of time. The processes are based on a novel usage of a plurality of computer vision technologies to analyze the behavior of the people from the plurality of input images.

34 Claims, 10 Drawing Sheets

U.S. PATENT DOCUMENTS

2007/0282479 A1* 12/2007 Shibuya et al. ............... 700/111
2009/0231436 A1* 9/2009 Faltesek et al. ............... 348/169
2010/0016052 A1* 1/2010 Gagner et al. .................. 463/16
2011/0022421 A1* 1/2011 Brown et al. ..................... 705/4

OTHER PUBLICATIONS

U.S. Appl. No. 60/874,585, Jung, et al.

* cited by examiner

METHOD AND SYSTEM FOR RECOGNIZING EMPLOYEES IN A PHYSICAL SPACE BASED ON AUTOMATIC BEHAVIOR ANALYSIS

CROSS-REFERENCE TO RELATED APPLICATIONS

This application claims the benefit of U.S. Provisional Patent Application No. 60/921,890, filed Apr. 5, 2007.

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system for recognizing employees in a physical space based on automatic behavior analysis of the people in a preferred embodiment. The processes in the present invention are based on a novel usage of a plurality of computer vision technologies to analyze the behavior of the people from the plurality of input images.

2. Background of the Invention

The present invention is a method and system for recognizing employees in a physical space based on automatic behavior analysis of the people in a video, and the present invention can utilize any reliable automatic behavior analysis method and system in an exemplary embodiment. There have been earlier attempts for understanding people's behaviors, such as customers' shopping behaviors, captured in a video in a targeted environment, such as in a retail store, using cameras. However, the prior arts do not disclose all the features and novel usages of an automatic behavior analysis in the present invention, especially for employee recognition. The differences between the features that the present invention comprises in the automatic behavior analysis for employee recognition and the features in the relevant prior arts can be discussed as follows.

With regard to the temporal behavior, U.S. Pat. Appl. Pub. No. 2003/0002712 of Steenburgh, et al. (hereinafter Steenburgh) disclosed a method for measuring dwell time of an object, particularly a customer in a retail store, which enters and exits an environment, by tracking the object and matching the entry signature of the object to the exit signature of the object, in order to find out how long people spend in retail stores. However, Steenburgh is clearly foreign to the idea of using the dwell time of people in a physical space as one of the employee recognition criteria. Steenburgh do not distinguish employees from shoppers.

U.S. Pat. Appl. Pub. No. 2003/0058339 of Trajkovic, et al. (hereinafter Trajkovic) disclosed a method for detecting an event through repetitive patterns of human behavior. Trajkovic learned multidimensional feature data from the repetitive patterns of human behavior and computed a probability density function (PDF) from the data. Then, a method for the PDF analysis, such as Gaussian or clustering techniques, was used to identify the repetitive patterns of behavior and unusual behavior through the variance of the Gaussian distribution or cluster.

Although Trajkovic showed a method of modeling a repetitive behavior through the PDF analysis, Trajkovic is clearly foreign to the idea of recognizing employees in a physical space, and there is no explicit disclosure of applying their method for the employee recognition. Furthermore, Trajkovic is clearly foreign to the idea of non-repetitive employee behavior, such as non-repetitive employee trips to a predefined area in a physical space or employees' non-repetitive responsive behavior to a predefined event.

There have been earlier attempts for activity analysis in various other areas. The following prior arts disclosed methods for object activity modeling and analysis for the human body, using a video, in general.

U.S. Pat. Appl. Pub. No. 2003/0053659 of Pavlidis, et al. (hereinafter Pavlidis) disclosed a method for moving object assessment, including an object path of one or more moving objects in a search area, using a plurality of imaging devices and segmentation by background subtraction. In Pavlidis, the term "object" included customers, and Pavlidis also included itinerary statistics of customers in a department store. However, Pavlidis was primarily related to monitoring a search area for surveillance.

In addition, Pavlidis is clearly foreign to the idea of recognizing the employees as a distinction from the customers in a physical space. Therefore, Pavlidis does not explicitly discuss about how to distinguish between the moving objects as employees and the moving objects as customers. In the present invention, the behavior analysis for the employee recognition can work with context-dependent information. For example, even if the traffic pattern of the employees may look similar to that of customers, the present invention can differentiate the traffic pattern between the employees and customers according to context-dependent employee recognition criteria, such as spatial rules or predefined area rules. Pavlidis is clearly foreign to the idea of such rule application and employee recognition criteria.

U.S. Pat. Appl. Pub. No. 2004/0120581 of Ozer, et al. (hereinafter Ozer) disclosed a method for identifying activity of customers for a marketing purpose or activity of objects in a surveillance area, by comparing the detected objects with the graphs from a database. Ozer tracked the movement of different object parts and combined them to high-level activity semantics, using several Hidden Markov Models (HMMs) and a distance classifier.

Although Ozer also briefly mentioned tracking the activities of employees for human factors studies, Ozer is clearly foreign to the features of employee recognition in the present invention. First of all, while the present invention uses the tracking of the employees' trips in a physical space and the patterns in the tracking for the behavior analysis in the preferred embodiment, Ozer's approach is to model the object by invariant shape attributes and then compare the object model with a set of stored models. As a matter of fact, Ozer explicitly mentioned that their approach took a different method away from the motion detection and tracking in an argument, upon which the inventors in the present invention cannot agree completely, by the way. This clearly shows that Ozer is further foreign to the idea of employee recognition, utilizing the tracking and trip-based behavior analysis. Furthermore, Ozer is clearly foreign to the concept of employee recognition criteria that are disclosed in the present invention.

U.S. Pat. Appl. Pub. No. 2004/0131254 of Liang, et al. (hereinafter Liang) also disclosed the Hidden Markov Models (HMMs) as a way, along with the rule-based label analysis and the token parsing procedure, to characterize behavior. Liang disclosed a method for monitoring and classifying actions of various objects in a video, using background subtraction for object detection and tracking. However, Liang is particularly related to animal behavior in a lab for testing drugs, and Liang is clearly foreign to the concept and novel usage of employee recognition based on the behavior analysis applied by the employee recognition criteria in a physical space, such as a retail space.

Computer vision algorithms have been shown to be an effective means for detecting and tracking people. These algorithms have also been shown to be effective in analyzing the behavior of people in the view of the means for capturing images. This allows the possibility of connecting the visual information in the behavior analysis from the captured video images to the employee recognition. Any reliable automatic behavior analysis in the prior art may also be used for the behavior analysis part of the processes that will later be used as a basic tool for the employee recognition of the people in the exemplary embodiment of the present invention. However, the prior arts lack the employee recognition features that are disclosed in the present invention. The above prior arts are foreign to the concept of recognizing the employees based on automatic behavior analysis on video images and the employee recognition criteria applied to their behaviors, while tracking and analyzing the movement information of the employees in consideration of the employee recognition criteria in a physical space, such as a retail store.

Therefore, it is an objective of the present invention to provide a novel approach for recognizing the employees based on their behaviors, particularly utilizing the information from the automatic behavior analysis in video images that are captured by at least one means for capturing images in a physical space, and predefined employee recognition criteria.

It is another objective of the present invention to provide a novel solution for the employee recognition by automatically and unobtrusively analyzing the employees' behaviors based on the collection of trip information from the tracking of their trips without involving any hassle of requiring the employees to carry a cumbersome device in the automatic behavior analysis.

SUMMARY

The present invention is a method and system for recognizing a plurality of employees among the people in a physical space based on automatic behavior analysis of the people in the physical space.

The processes are based on a novel usage of a plurality of computer vision technologies to analyze the behavior of the persons from the plurality of input images. It is an objective of the present invention to efficiently handle complex human behavior from video sources utilizing a plurality of computer vision technologies, such as person detection and tracking, in a preferred embodiment.

The present invention captures a plurality of input images of the people in the physical space by a plurality of means for capturing images and tracks each person. Then, the present invention processes the plurality of input images in order to analyze the behavior of the people. The present invention recognizes the employees among the people by applying employee recognition criteria to the output of the behavior analysis based on the tracking of the people.

The behavior analysis can comprise a path analysis as one of the characterization methods. The path analysis collects a plurality of trip information for each person tracked during a predefined window of time. In the embodiment of the present invention, the trip information can comprise: attributes for initial point and destination, coordinates of the person's position, temporal attributes (such as trip time and trip length), and average velocity for each of the plurality of trips. Based on employee recognition criteria applied to the trip information, the path analysis can be used to distinguish employees from non-employees.

The present invention efficiently handles the joining of the plurality of tracks across the multiple fields of view of the plurality of means for capturing images, accounting for splits and merges, and finds the information for the trip of the person based on the processed results from the plurality of tracks.

The dwell time of the people in a specific location of the physical space and the comparison against predefined thresholds can be used as one of the exemplary criteria for defining the targeted employee recognition behavior and deciding whether a person belongs to a relevant employee group. Other exemplary information for the video-based behavior analysis can comprise a sequence of visits or a combination of visits to a predefined subspace in the physical space by the plurality of persons.

In an exemplary embodiment, the present invention can construct the employee recognition criteria based on a set of predefined rules. The present invention can further construct the employee recognition criteria based on a combination of a set of predefined rules, in which the population in the physical space can be further divided into subpopulations by the combination of rules. In an embodiment of the present invention, the employee recognition criteria can comprise: spatial rules, temporal rules, rules for using repetitive pattern of behavior, rules for the behavior changes caused by a specific event in the physical space, and rules for utilizing the relationship among the tracks of people. The present invention can further define domain-specific criteria for the employee recognition criteria. Examples of the domain-specific criteria can comprise criteria that are constructed based on retail-specific rules.

The present invention can further apply a different set of criteria per each employee recognition group, so that the application of the different set of criteria per each employee recognition group allows the decision maker in the physical space to understand each employee recognition group separately, depending on the their positions or roles.

Based on the criteria, the present invention can assign an employee label to each of the employees during a predefined window of time at the employee recognition process. The employee recognition can also be processed by different time of day.

In another exemplary embodiment, the present invention can utilize a rule-based logic module for applying the employee recognition criteria to the behavior analysis data. The logic module enables dynamic rule application, where the employee recognition can be adjusted in a much easier and more structured way whenever there is a need for changes in the rules, which represent the employee recognition criteria, defined in the module, rather than relying on an ad hoc solution or static hard code.

In another exemplary embodiment, the employee recognition criteria can also be constructed based on a learning algorithm of the input training population or an example-based behavior recognition algorithm. Application of distance measure and clustering can be used for the learning algorithm-based behavior analysis. The learning algorithm based behavior analysis, in which the features of the behavior comprise duration of dwell time, start, end, number of stops, location of stops, average length of stops, velocity change, repetition of location, displacement of stops, non-uniform pattern, percentage of time spent in a specific employee region, color signature of tracks of the plurality of persons. These behavioral features represent the behavioral aspects of the trajectories, and can be used to train either the unsupervised clustering method such as k-Means algorithm, or the supervised exemplar-based machine learning method, such as a Support Vector Machine.

The employee recognition steps in the present invention can be applied to a plurality of physical spaces in a network of the physical spaces. An exemplary network of the physical spaces can comprise a large number of retail stores. In the network of the physical spaces, the present invention can differentiate the levels of employee recognition.

The physical space may be a retail space, and the persons may comprise customers and employees in the retail space in the description of the invention. However, although the disclosed method may be described in the context of a retail space, the present invention can be applied to any physical space that has a restricted boundary and the employer, employee, and customer relationship within it, and the application area of the present invention is not limited to the retail space.

In regard to retail space application, the present invention can provide an unprecedented opportunity for manufacturers and retailers to analyze and optimize the performance of the business establishment in the retail space using automated tools for behavior and employee recognition analysis in the retail space.

Most manufacturers can tell how their business establishment is performing based on point-of-sale data, but they do not have a clear understanding of how the employees and their movements affect the customers' activities in the retail space. The automated employee recognition analysis in the present invention offers fact-based insights about the employees for a particular physical space, which enables manufacturers and retailers to develop successful customer-centric strategies by utilizing the employee data in regards to the entire people data in the physical space and to improve the overall performance of the physical space.

The benefits of the automated behavior analysis and employee recognition technology in the present invention can comprise: improvement in physical space performance based on a deep understanding of customer-only behaviors, design of effective retail programs, efficient product assortment strategies, efficient use of space, improvement in the performance and productivity of employees through employee behavior statistics, increased customer service performance through refined employees' interaction with customers, and actual measurement for the correlation between the employees' performance and sales.

Retailers and manufacturers utilize a variety of data sources to try to better understand their customers and potential customers. The employee recognition can be used for more targeted approaches in reaching customers and "customer-centric" marketing by differentiating employees from the customers. In the present invention, the ability to offer insights for employees, as defined by their actual in-store behavior, represents a huge move forward in customer-centric approaches and strategies. It bolsters current targeting based on behavior patterns with reliable, statistically significant data.

In addition, it will provide marketers with the ability to uncover new patterns and trends in employee behavior, and increase their performance in the physical space.

A major difficulty with in-store research of all types is that employees or staff of the retail location can, and most often do, skew results of such research due to their mere presence and/or the fact that their behavior is often distinctly different from that of a shopper. This issue exists due to the absence of methods to accurately and efficiently distinguish employees from shoppers and filter those employees from the samples utilized for in-store research.

The capability of the present invention to identify employees based on their behavior patterns provides an ability to filter data associated with those employees from research findings. This provides much, more accurate and representative insights, which are based solely on shopper behavior and are not tainted or biased by the behavior of employees. The approach in the present invention, which utilizes automated video analysis to discern behavior patterns specific to employees, is a much more practical, scalable and accurate approach when compared to other options for filtering employees during in-store research. One such option would be manual observers making subjective judgments to identify employees for the purpose of extracting them from the sample on which analysis is based.

It is a further objective of the present invention to extract analytical and statistical data from the employee recognition. The present invention can represent the output of the employee recognition as layers of information, maps, tables, or pie charts.

DRAWINGS

Figures

DETAILED DESCRIPTION OF THE INVENTION

Figure 1:
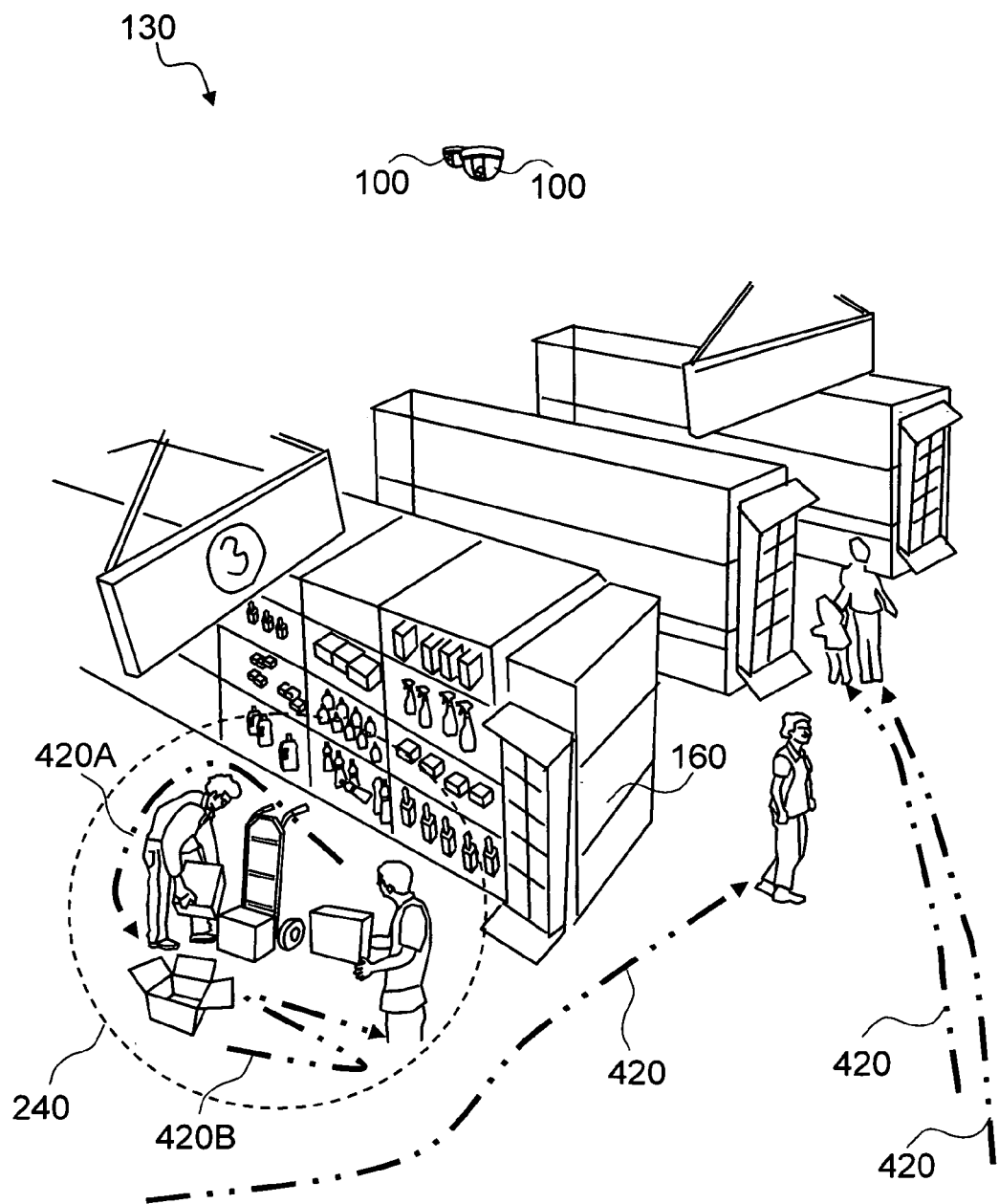
FIG. 1 is an overview of a preferred embodiment of the invention, where the present invention recognizes a plurality of employees based on the behavior analysis in a physical space.

FIG. 1 is an overview of a preferred embodiment of the invention, where the present invention recognizes a plurality of employees based on the behavior analysis in a physical space 130. The present invention is a method and system for recognizing a plurality of employees among the people in a physical space 130 based on automatic behavior analysis of the people in the physical space 130.

A Preferred Embodiment

The processes are based on a novel usage of a plurality of computer vision technologies to analyze the behavior of the persons from the plurality of input images. It is an objective of the present invention to efficiently handle complex human behavior from video sources utilizing a plurality of computer vision technologies, such as person detection and tracking, in a preferred embodiment.

The present invention captures a plurality of input images of the people in the physical space 130 by a plurality of means for capturing images 100 and tracks each person. Then, the present invention processes the plurality of input images in order to analyze the behavior of the people. The present invention recognizes the employees among the people by applying employee recognition criteria to the output of the behavior analysis based on the tracking 420 of the people.

In the exemplary embodiment shown in FIG. 1, the persons with "tracking 1" 420A and "tracking 2" 420B are recognized 240 as employees among the people in the physical space 130 because the behavior analysis for the tracking of them matches the employee detection criteria. In this particular application of the present invention, the employees' dwell time in the vicinity of an "object in physical space" 160, i.e., a shelf, passes more than a temporal threshold, and the tracking of their trips, "tracking 1" 420A and "tracking 2" 420B, show certain patterns that are recognizable as those of employees in the employee detection criteria. For example, the tracking of their trips stayed within a limited area in the vicinity of the "object in physical space" 160 during the dwell time.

The behavior analysis can comprise a path analysis as one of the characterization methods. The present invention processes the plurality of input images in order to track each person in the plurality of persons in each field of view of the plurality of means for capturing images 100. The present invention processes the path analysis for each person in the plurality of persons for the video-based behavior analysis based on the tracking in an exemplary embodiment.

The path analysis collects a plurality of trip information for each person tracked during a predefined window of time. In the embodiment of the present invention, the trip information can comprise attributes for initial point and destination, coordinates of the person's position, temporal attributes, such as trip time and trip length, and average velocity for each of the plurality of trips. Based on employee recognition criteria applied to the trip information, the path analysis can be used to distinguish employees from non-employees.

The present invention efficiently handles the joining of the plurality of tracks across the multiple fields of view of the plurality of means for capturing images 100, accounting for splits and merges, and finds the information for the trip of the person based on the processed results from the plurality of tracks.

The dwell time of the people in a specific location of the physical space 130 and the comparison against predefined thresholds can be used as one of the exemplary criteria for defining the targeted employee recognition behavior and deciding whether a person belongs to a relevant employee group.

Other exemplary information for the video-based behavior analysis can comprise a sequence of visits or a combination of visits to a predefined subspace in the physical space 130 by the plurality of persons.

Retail Space Application

The physical space 130 may be a retail space, and the persons may comprise customers and employees in the retail space in the description of the invention. However, although the disclosed method may be described in the context of a retail space, the present invention can be applied to any physical space 130 that has a restricted boundary and the employer, employee, and customer relationship within it, and the application area of the present invention is not limited to the retail space.

In regard to retail space application, the present invention can provide an unprecedented opportunity for manufacturers and retailers to analyze and optimize the performance of the business establishment in the retail space, using automated tools for behavior and employee recognition analysis in the retail space.

Most manufacturers can tell how their business establishment is performing based on point-of-sale data, but they do not have a clear understanding of how the employees and their movements affect the customers' activities in the retail space.

The solution in the present invention is based on proprietary technology that automatically recognizes 240 employees in a retail space and can be used for various purposes. In one exemplary application, the recognized employee data can be filtered out so that a market analysis, especially automatic computer vision technology based market analysis, for the people's behavior in a physical space can be measured based on customer-only data. In another exemplary application, the employees' influence on the customers' activities in the retail space can also be measured by analyzing the relationship between the employee data and the customer behavior analysis in the retail space. The solution leverages the strengths of the technologies in the present invention and processes to deliver a new level of access to the understanding of customer activities, not to mention the employees' activities.

It is a further objective of the present invention to extract analytical and statistical data from the employee recognition. The present invention can represent the output of the employee recognition as layers of information, maps, tables, or pie charts.

Usefulness of the Present Invention

The automated solution provides the owner of the present invention with fact-based insights to improve the overall performance of the physical space 130. Employee recognition analysis will offer insights about the employees for a particular physical space 130, which enables manufacturers and retailers to develop successful customer-centric strategies by utilizing the employee data in regard to the entire people data in the physical space 130.

The benefits of the automated behavior analysis and employee recognition technology in the present invention for the manufacturers and retailers who own the embodiment of the present invention can comprise:

Improvement in physical space 130 performance based on a deep understanding of customer-only behaviors by subtracting employee data from the entire people behavior analysis in the physical space 130. More accurate market analysis of the customers can be made by removing the employee data from the analysis.

Design of effective retail programs by understanding market level customer-only profiles and preferences can be achieved. Domain-specific interaction of the customer data can be measured.

Efficient product assortment strategies, which are complete, profitable, and satisfy the customer needs, can be implemented.

Efficient use of space based on the pure customer interaction data in the store can be achieved, resulting in an improved shopping environment, higher profits, and less frequent out-of-stocks.

Employee behavior statistics can be utilized to improve the performance and productivity of employees. For example, the workloads and schedules can be adjusted for the optimal operation.

Employees' interaction with customers can be refined, which also essentially increases the customer service performance.

Correlation between the employees' performance and sales can be measured.

More accurate media effectiveness measurement and traffic analysis can be calculated.

Retailers and manufacturers utilize a variety of data sources to try to better understand their customers and potential customers. The employee recognition can be used for more targeted approaches in reaching customers and "customer-centric" marketing by differentiating employees from the customers. In the present invention, the ability to offer insights for employees, as defined by their actual in-store behavior, represents a huge move forward in customer-centric approaches and strategies. It bolsters current targeting based on behavior patterns with reliable, statistically significant data.

In addition, it will provide marketers with the ability to uncover new patterns and trends in employee behavior and increase their performance in the physical space 130.

A major difficulty with in-store research of all types is that employees or staff of the retail location can, and most often do, skew results of such research due to their mere presence and/or the fact that their behavior is often distinctly different from that of a shopper. This issue exists due to the absence of methods to accurately and efficiently distinguish employees from shoppers and filter those employees from the samples utilized for in-store research.

The capability of the present invention to identify employees based on their behavior patterns provides an ability to filter data associated with those employees from research findings. This provides much more accurate and representative insights, which are based solely on shopper behavior and are not tainted or biased by the behavior of employees. The approach in the present invention, which utilizes automated video analysis to discern behavior patterns specific to employees, is a much more practical, scalable and accurate approach when compared to other options for filtering employees during in-store research. One such option would be manual observers making subjective judgments to identify employees for the purpose of extracting them from the sample on which analysis is based.

Figure 2:
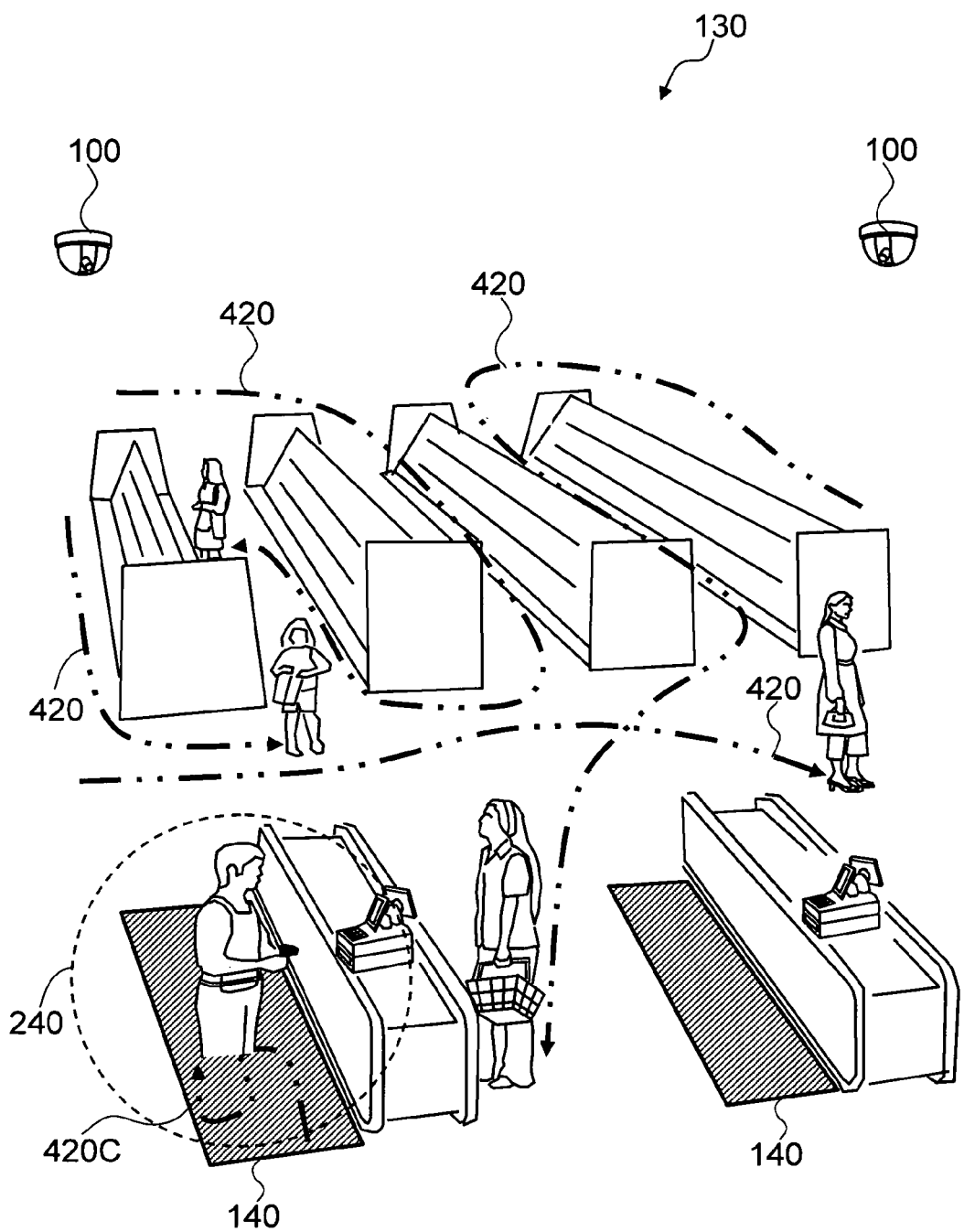
FIG. 2 shows an overview of another exemplary embodiment of the invention, where the present invention recognizes a plurality of employees based on the behavior analysis in a predefined area of a physical space.

FIG. 2 shows an overview of another exemplary embodiment of the invention, where the present invention recognizes 240 a plurality of employees based on the behavior analysis in a predefined area of a physical space 130.

In the exemplary embodiment shown in FIG. 2, the person with "tracking 3" 420C is recognized 240 as an employee among the people in the physical space 130 because the behavior analysis for the tracking of the person matches an employee detection criteria. In this particular application of the present invention, the employee's tracking stays within a "predefined area" 140, e.g., employee-only counter area, in the physical space during a predefined window of time, which is recognizable as an employee tracking according to the employee detection criteria.

Figure 3:
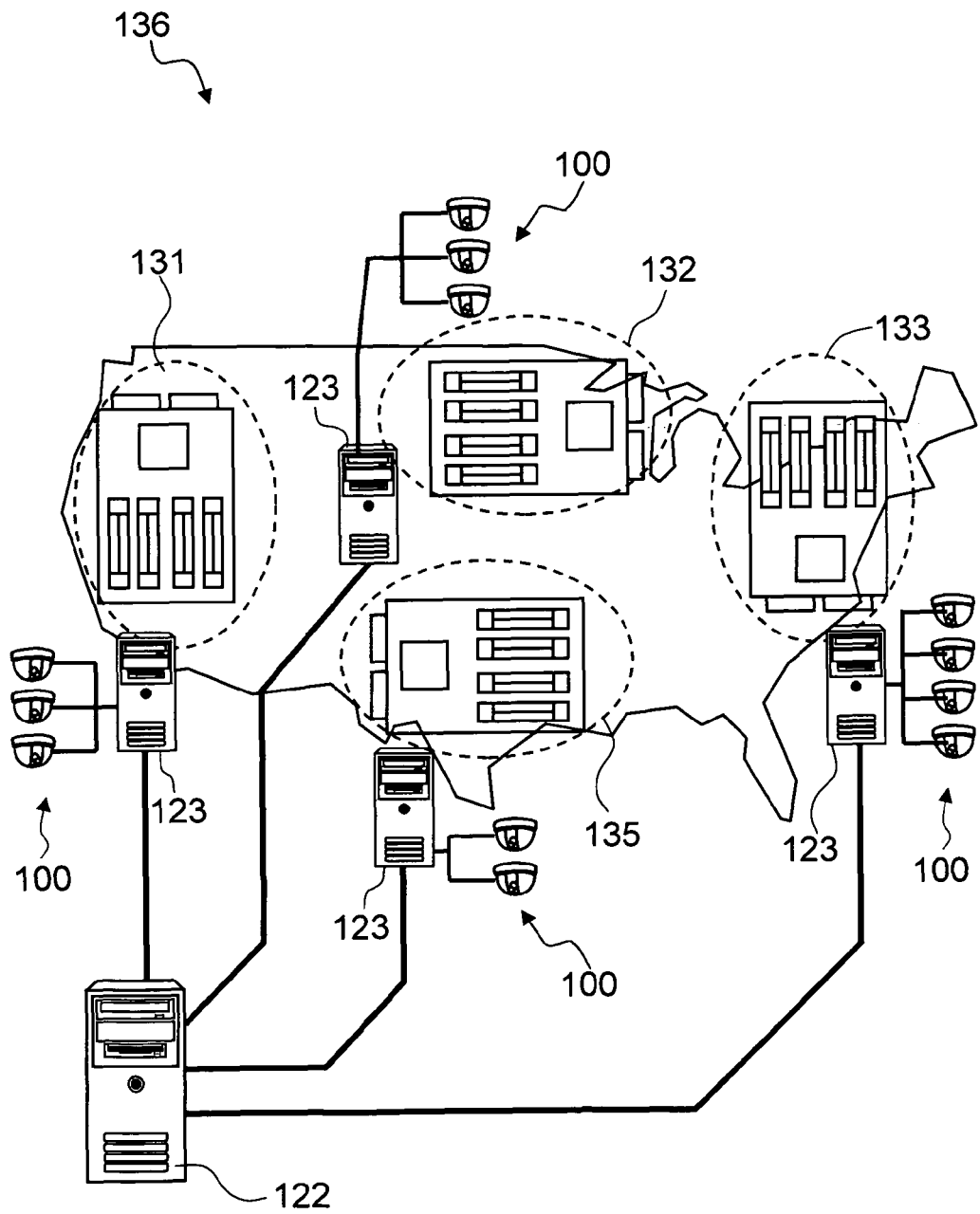
FIG. 3 shows an exemplary employee recognition process that can be applied to a plurality of physical spaces in a network of the physical spaces.

FIG. 3 shows an exemplary employee recognition process that can be applied to a plurality of physical spaces in a network of the physical spaces.

Application to the Network of Physical Spaces

The employee recognition steps in the present invention can be applied to a plurality of physical spaces in a network of the physical spaces. An exemplary network of the physical spaces can comprise a large number of retail stores.

In the "network of the physical spaces" 136, the present invention can differentiate among the levels of employee recognition in the network of the physical spaces, e.g., "physical space 1" 131, "physical space 2" 132, "physical space 3" 133, and "physical space N" 135 shown in FIG. 3, in which a first set of employee recognition criteria are applied throughout the network and a second set of employee recognition criteria are applied to a predefined subset of the network of the physical spaces to serve specific needs of the predefined subset. An exemplary first set of employee recognition criteria can typically comprise common employee recognition criteria throughout the network, and a second set of employee recognition criteria is typically different from the first set of employee recognition criteria.

In the exemplary embodiment shown in FIG. 3, a "central server" 122 controls a plurality of vision processing units (VPUs). The "vision processing unit" 123 comprises a means for control and processing, means for video interface, and a plurality of means for capturing images 100. The VPU processes the employee recognition of each physical space in coordination with the "central server" 122.

In the exemplary embodiment shown in FIG. 3, a plurality of means for capturing images 100 are connected to the means for video interface. The means for control and processing takes digitized video data from the means for video interface. The means for control and processing can have internal means for storing data or external means for storing data.

The means for capturing images 100 can comprise an analog camera, USB camera, or Firewire camera. The means for video interface, which can comprise a video frame grabber, USB interface, or Firewire interface, are typically included in the same enclosure as the means for control and processing. The means for control and processing can be a general-purpose personal computer, such as a Pentium 4 PC, or a dedicated hardware that can carry out the required computation. The means for control and processing, as well as the means for video interface, can be placed locally or remotely, as long as the connection to the means for capturing images 100 can be established. The internal means for storing data, such as internal hard disks, is placed within the same enclosure as the means for control and processing. The external means for storing data, such as a network storage driver or internal hard disks contained in a remote computer, can be placed locally or remotely, as long as a means for transferring data is available.

In an exemplary embodiment, a general-purpose USB webcam can serve as the means for capturing images 100. A Pentium 4 2.8 GHz PC having 1 GB memory can serve as a means for control and processing, where a generic USB interface included in the PC's motherboard can serve as a means for video interface. A generic IDE hard disk drive can serve as the internal means for storing data or the external means for storing data.

Figure 4:
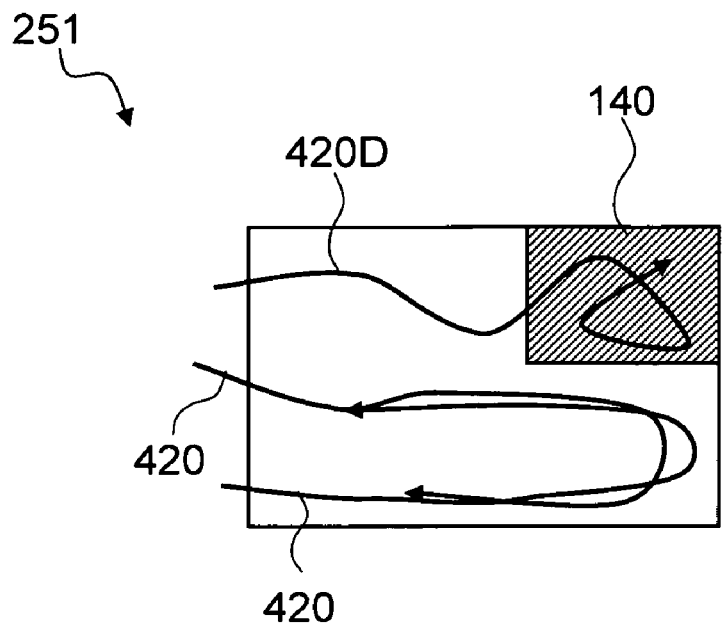
FIG. 4 shows exemplary employee recognition criteria based on spatial and temporal rules that are applied to the trip information of the people in a physical space.
Figure 4:
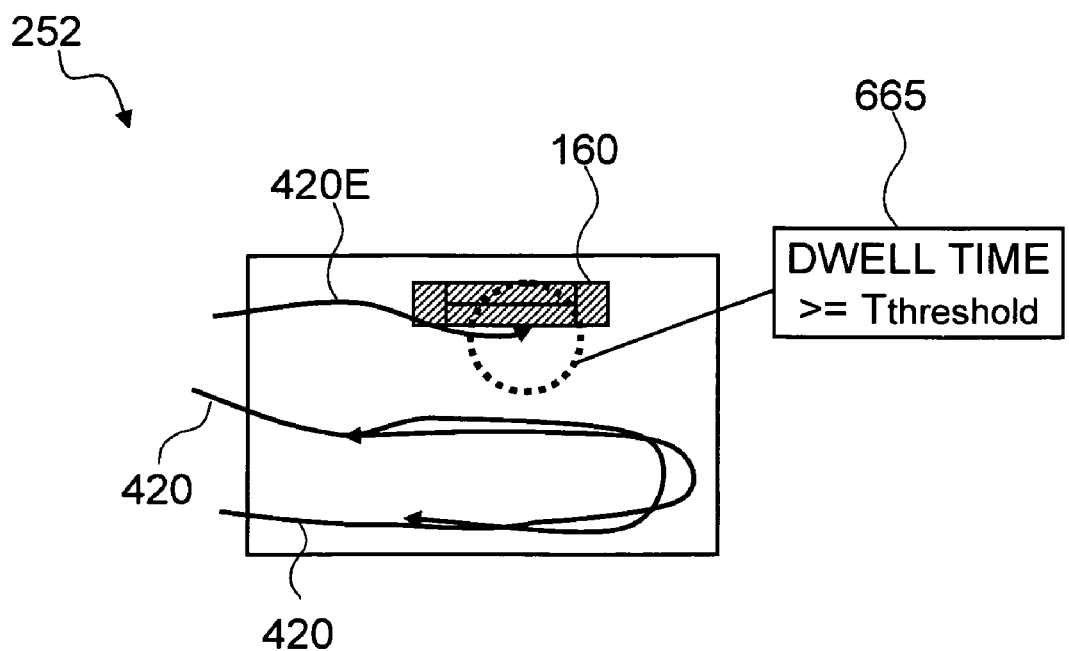

FIG. 4 shows exemplary employee recognition criteria based on spatial and temporal rules that are applied to the trip information of the people in a physical space 130.

Employee Recognition Criteria

In an exemplary embodiment, the present invention can construct the employee recognition criteria based on a set of predefined rules, in which the set of predefined rule's is essentially a set of employee recognition rules. The present invention can further construct the employee recognition criteria based on a combination of a set of predefined rules, in which the population in the physical space 130 can be further divided into subpopulations by the combination of rules.

In an embodiment of the present invention, the employee recognition criteria can comprise:

- Spatial rules, which comprise at least one threshold for the frequency of tracking in a "predefined area" 140 of the physical space 130. Examples of the spatial rules can comprise frequency detection of the tracking in the employee only area, specific area, exit, and area behind counter. If a tracking or frequency of the tracking stays in a predefined area, such as employee only area, the person to whom the tracking belongs can be recognized as an employee.
- Temporal rules, which comprise at least one threshold for dwell time and average trip time in a specific place of the physical space 130. Examples of behavior detection by the temporal rules can comprise stocking behavior for the shelves over certain duration of time.
- Rules for using repetitive pattern of behavior. Examples of such rules can comprise repetitive trips between two points in the physical space 130.
- Rules for the behavior changes caused by a specific event in the physical space 130, in which the behaviors driven by predefined specific events can be translated as the targeted employee behavior. Examples of such behavior can comprise responsive behavior to an announcement for the employee in the physical space 130, and change of velocity and direction in the tracking.
- Rules for utilizing the relationship among the tracks of people, in which the relationship shows the employee and non-employee interaction. Examples of such relationship can comprise one-to-many mapping of tracking interaction over a period of time, in which one track interacts with multiple tracks.

The present invention can further define domain-specific criteria for the employee recognition criteria. Examples of the domain-specific criteria can comprise criteria that are constructed based on retail-specific rules.

The present invention can further apply a different set of criteria per each employee recognition group, so that the application of different set of criteria per each employee recognition group allows the decision maker in the physical space 130 to understand each employee recognition group separately.

For example, the present invention can differentiate the levels of employee recognition in a physical space 130 based on their position or role, in which a first set of employee recognition criteria are applied to a certain group of employees, and a second set of employee recognition criteria are applied to another group of employees. An exemplary first set of employee recognition criteria can comprise criteria for management level employees, and the second set of employee recognition criteria can be different from the first set of employee recognition criteria in this type of exemplary embodiment.

Based on the criteria, the present invention can assign an employee label to each of the employees during a predefined window of time at the employee recognition process. The employee recognition can also be processed by different time of day.

In another exemplary embodiment, the present invention can utilize a rule-based logic module for applying the employee recognition criteria to the behavior analysis data. The logic module enables dynamic rule application, where the employee recognition can be adjusted in a much easier and more structured way whenever there is a need for changes in the rules, which represent the employee recognition criteria, defined in the module, rather than relying on an ad hoc solution or static hard code.

The employee recognition criteria can also be constructed based on a learning algorithm of the input training population, such as unsupervised clustering approach based on similarity measure of the behavioral features, or an example-based behavior recognition algorithm. Distance measure and clustering can be used for the learning algorithm based behavior analysis.

The learning algorithm based behavior analysis, in which the features of the behavior comprise duration of dwell time, start, end, number of stops, location of stops, average length of stops, velocity change, repetition of location, displacement of stops, non-uniform pattern, percentage of time spent in a specific employee region, color signature of tracks of the plurality of persons. These behavioral features represent the behavioral aspects of the trajectories, and can be used to train either the unsupervised clustering method such as k-Means algorithm, or the supervised exemplar-based machine learning method, such as a Support Vector Machine.

The exemplary "employee recognition criteria 1" 251 in FIG. 4 shows how the present invention can utilize spatial rules for the recognition of the employee trip among the tracking of the people in a physical space. The present invention can discern the "tracking 4" 420D from other tracking 420 of persons because the "tracking 4" 420D shows a certain frequency in the "predefined area" 140, such as employee only area, of the physical space 130. The "employee recognition criteria 1" 251 in FIG. 4 can include this kind of spatial restriction as one of the spatial rules.

In another exemplary "employee recognition criteria 2" 252 shown in FIG. 4, the present invention can utilize temporal rules for the employee recognition. One exemplary temporal rule can be defined as, "If the dwell time 665 of a tracking, e.g., 'tracking 5' 420E, in an area, such as in the vicinity of an 'object in physical space' 160, satisfies certain predefined time threshold, Tthreshold, the person to whom the tracking belongs can be recognized as an employee".

Figure 5:
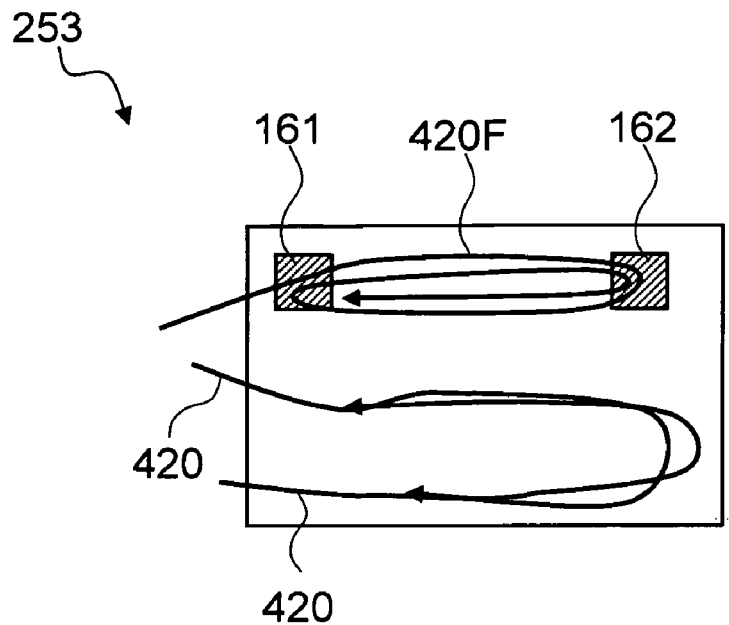
FIG. 5 shows exemplary employee recognition criteria based on repetitive patterns and predefined employee related events that are applied to the trip information of the people in a physical space.
Figure 5:
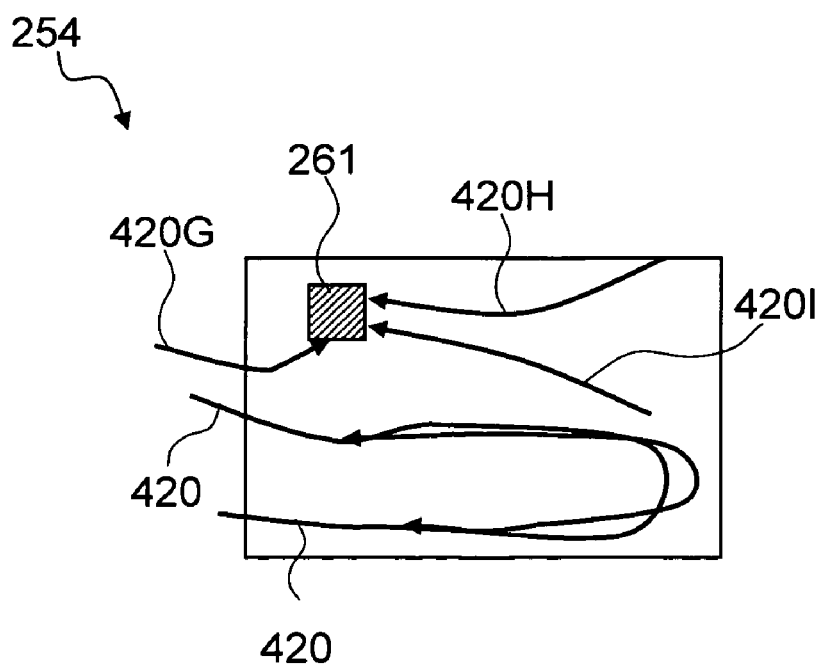

FIG. 5 shows exemplary employee recognition criteria based on repetitive patterns and predefined employee related events that are applied to the trip information of the people in a physical space 130.

In the exemplary "employee recognition criteria 3" 253 in FIG. 5, the present invention can utilize repetitive pattern of the person tracking for the recognition of the employee. One exemplary criteria based on a repetitive pattern can be defined as, "If a tracking of a person's trip, e.g., 'tracking 6' 420F, shows repetitive patterns during a window of time among a plurality of predefined objects in the physical space, e.g., 'object in physical space 1' 161 and 'object in physical space 2' 162, then the person to whom the tracking belongs can be recognized as an employee". Examples of the plurality of predefined objects in the physical space can include a customer service area, employee only area, shelf area, or other types of business establishment objects in the physical space.

In the exemplary "employee recognition criteria 4" 254 in FIG. 5, the present invention can utilize "predefined employee related event" 261 for the recognition of the employee. One exemplary criteria based on "predefined employee related event" 261 can be defined as, "If a tracking, e.g., 'tracking 7' 420G, 'tracking 8' 420H, or 'tracking 9' 420I, is influenced by a 'predefined employee related event' 261, e.g., an announcement for employees or a special event intended for employees, in the physical space, then the person to whom the tracking belongs can be recognized as an employee". The detection of the influence can be processed based on the direction and velocity changes of the tracking for the employees.

Figure 6:
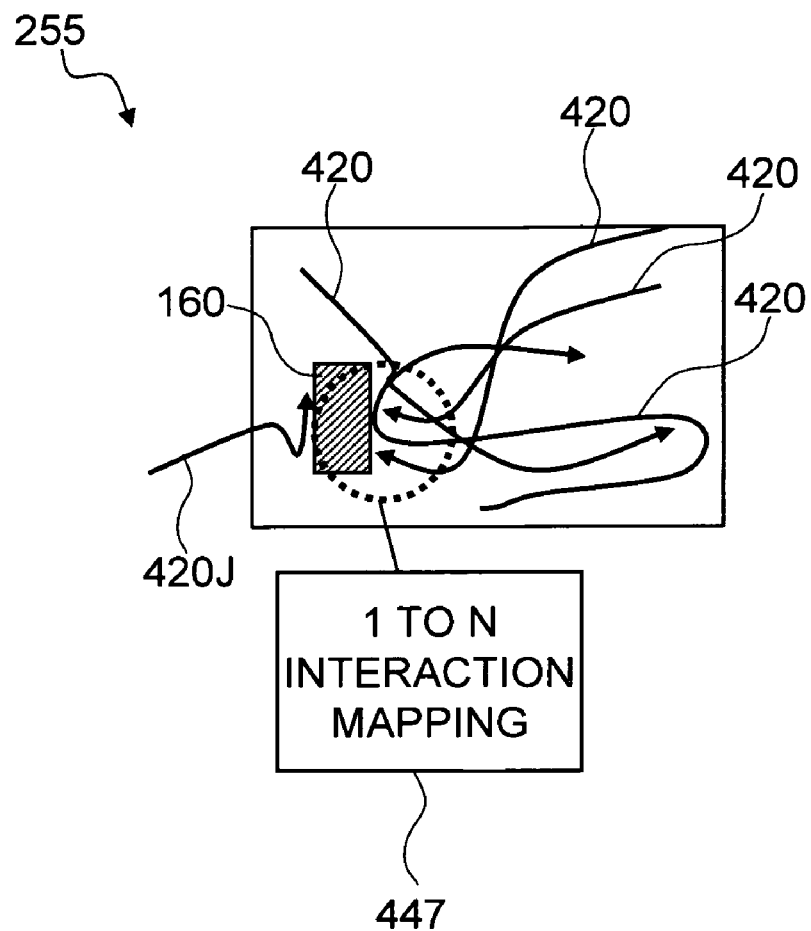
FIG. 6 shows exemplary employee recognition criteria based on the predefined relationship among the multiple trip information of the people in a physical space.

FIG. 6 shows exemplary employee recognition criteria based on the predefined relationship among the multiple trip information of the people in a physical space 130.

In the exemplary "employee recognition criteria 5" 255 in FIG. 6, the present invention can utilize the predefined relationship among the multiple person tracking for the recognition of the employee. One exemplary criteria based on the predefined relationship among the multiple person tracking can be defined as, "If a tracking of a person's trip, e.g., 'tracking 10' 420J, shows '1 to N interaction mapping' 447 of tracks during a window of time with a plurality of tracking of people in the physical space, then the person to whom the tracking belongs can be recognized as an employee". Especially, if the "1 to N interaction mapping" 447 of tracks happens in the vicinity of an "object in physical space" 160, the search for the mapping can be facilitated.

Figure 7:
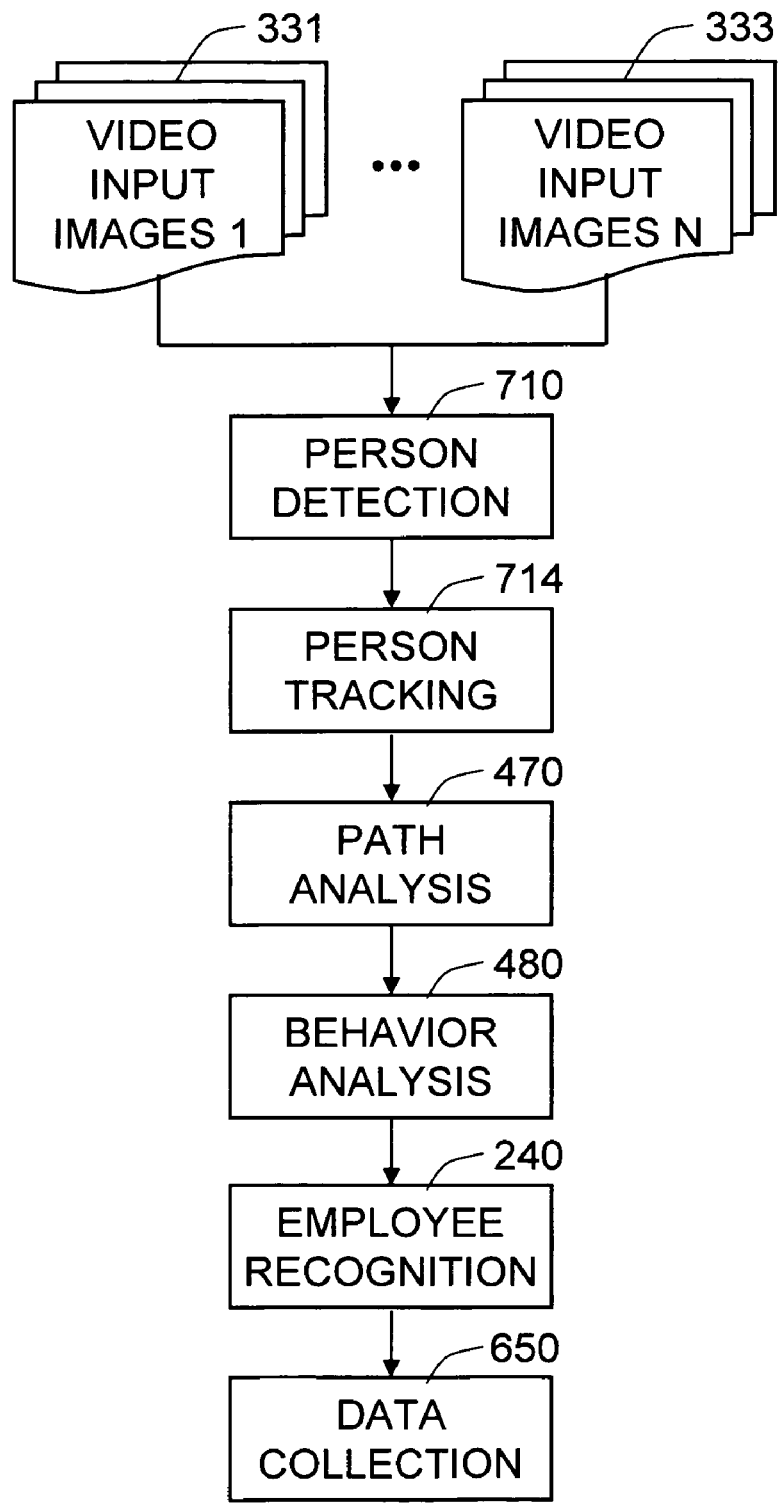
FIG. 7 shows overall processes of the employee recognition based on automatic behavior analysis in an exemplary embodiment of the present invention.

FIG. 7 shows overall processes of the employee recognition 240 based on automatic behavior analysis in an exemplary embodiment of the present invention.

In the exemplary embodiment shown in FIG. 7, the present invention captures a plurality of input images, including "video input images 1" 331 through "video input images N" 333, of the persons in the physical space 130 by a plurality of means for capturing images 100. Then, the present invention processes the plurality of input images for person detection 710 and person tracking 714. The person detection 710 and person tracking 714 are performed for each person in the plurality of persons in each field of view of the plurality of means for capturing images 100. Based on the tracking of the person, the present invention processes the path analysis 470 for each person in the plurality of persons, in which the present invention utilizes the coordinate sequence and temporal attributes from the tracking to create trip information of the person. The present invention utilizes the trip information in the path analysis as one of the ways to process the behavior analysis 480 of the persons. The present invention collects a plurality of trip information for each tracked person in the plurality of persons during a predefined window of time. The present invention recognizes 240 the employees among the plurality of persons by applying employee recognition criteria to the output of the video-based behavior analysis and collects 650 the employee recognition data during the predefined window of time.

In the embodiment of the present invention, the trip information can comprise attributes for initial point and destination, coordinates of the person's position, temporal attributes, such as trip time and trip length, and average velocity for each of the plurality of trips. Based on the trip information, the path analysis can be used to distinguish employee-specific paths from other non-employee paths, applying the employee recognition criteria to the trip information.

The present invention efficiently handles the joining of the plurality of tracks across the multiple fields of view of the plurality of means for capturing images 100, accounting for splits and merges, and finds the information for the trip of the person based on the processed results from the plurality of tracks.

The dwell time of the people in a specific location of the physical space 130 can be used as one of the exemplary criteria for defining the targeted behavior and deciding whether people are employees or not. Examples of the temporal targeted behavior can comprise certain behaviors that meet the predefined thresholds requirement for the employee-specific behavior.

Other exemplary information for the video-based behavior analysis can comprise a sequence of visits, a combination of visits to a predefined subspace in the physical space 130 by the plurality of persons, or certain pattern changes in the people's trip in regards to an adjacent group of other people in the physical space 130.

The present invention can utilize any reliable video-based tracking method for people in the prior art in regards to the behavior analysis.

U.S. Provisional Pat. No. 60/846,014 of Sharma, et al. (hereinafter Sharma 60/846,014) disclosed an exemplary process of video-based tracking and behavior analysis for a single customer or a group of customers using multiple means for capturing images 100, based on the spatial and temporal attributes of the person tracking. Although Sharma 60/846,014 focused on customer behavior analysis, their approaches and fundamental concepts can also be applied to the employee behavior analysis.

FIG. 20 and FIG. 21 in Sharma 60/846,014 show exemplary spatio-temporal primitives for modeling human-object behavior and exemplary shopping interaction levels that are observed to produce the behavioral analysis in a physical space 130. The spatio-temporal primitives for modeling human-object behavior can also be defined for employee-specific behaviors.

As described in Sharma 60/846,014, the behavior recognition can be achieved via spatio-temporal analysis of tracks, using geometry and pattern recognition techniques. The approach for defining and detecting spatio-temporal relations specific to the retail enterprise domain followed by a Bayesian Belief propagation approach to modeling primitive behaviors specific to the retail domain, (as an exemplary site of a media network in Sharma 60/846,014), can also be applied to any physical space 130.

In Sharma 60/846,014, the exemplary primitive behaviors were combined to model predefined complex behaviors. Then the behaviors of the people were analyzed based on the model. Applying this to the present invention, the employee recognition model can be created based on the combination of the primitive behaviors, i.e. the spatio-temporal primitives for modeling the employee-specific behaviors. Walkthrough history, the time spent in a certain area within a physical space 130, frequency pattern, relational pattern, and special event pattern can also be used as the exemplary attributes for the employee behavior analysis in the context of the present invention.

Utilizing the exemplary method for behavior analysis based on the spatio-temporal primitives and a model for the interaction levels based on the path analysis 470 of the people in a physical space 130 along with the predefined employee recognition criteria, the present invention can recognize 240 the employees among the people in the physical space.

As mentioned previously, the employee recognition criteria can also be constructed based on other types of exemplary methods for behavior analysis, which comprise a learning algorithm of the input training population, such as an unsupervised clustering approach based on similarity measure of the behavioral features, or exemplar-based behavior recognition algorithm.

In the exemplary method by unsupervised learning, clusters of trajectories based on temporal behaviors can be derived and used for classification. First, the trajectories of the tracking for a plurality of persons are accumulated over a period of time. Given a track, temporal and spatial features pertaining to the behavioral aspect (such as duration of dwell time, start, end, number of stops, location of stops, average length of stops, velocity change, repetition of location, displacement of stops, non-uniform pattern, percentage of time spent in a specific employee region, and color signature of tracks of the plurality of persons) is extracted to form a behavioral feature vector. The trajectories represented by these behavioral feature vector is clustered based on similarity measure of the behavioral features, using standard data clustering method such as k-Means algorithm. The clustering can produce multiple nodes, however, the nodes themselves can belong to either non-employee or employee categories. Once the cluster model for the trajectories has been determined, any new trajectory can be classified into one of these clusters, and subsequently into either the non-employee or employee categories.

In another exemplary embodiment, an example-based supervised behavior recognition algorithm can force the output of the trajectory to be one of the pre-defined behavioral classes. First, based on the observation on the people trajectories, multiple high-level behavioral classes are defined, such as stocking, helping customers, or entering/leaving employee area. Then, the system can train a learning machine such as Support Vector Machines, using a number of examples of the trajectories. The whole set or a subset of aforementioned behavioral features are utilized as an input to this machine learning approach.

Figure 8:
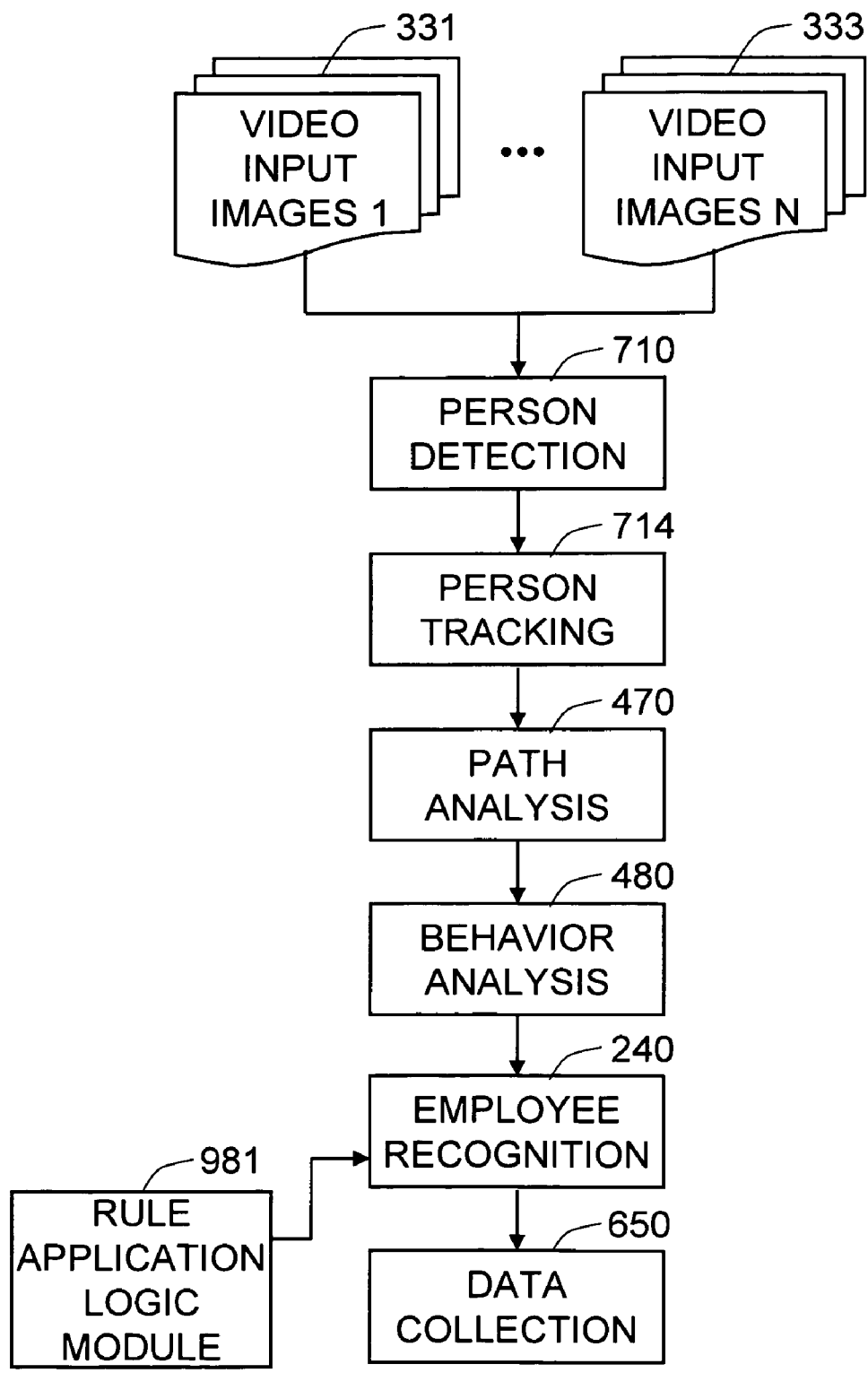
FIG. 8 shows overall processes of the employee recognition, in which a rule application module is used for applying employee recognition criteria at the employee recognition process in another exemplary embodiment of the present invention.

FIG. 8 shows overall processes of the employee recognition 240, in which a rule application module is used for applying employee recognition criteria at the employee recognition 240 process in another exemplary embodiment of the present invention.

In the exemplary embodiment shown in FIG. 8, the present invention can utilize a rule application logic module 981 for applying the employee recognition criteria to the behavior analysis data, in addition to the processes disclosed in regards to FIG. 7. The logic module enables dynamic rule application, where the employee recognition 240 can be adjusted in a much easier and more structured way whenever there is a need for changes in the rules, which represent the employee recognition criteria, defined in the module, rather than relying on an ad hoc solution or static hard code. An exemplary rule application logic module 981 can be implemented utilizing the information unit verification technologies in U.S. Provisional Pat. No. 60/874,585 of Jung, et al. (hereinafter Jung 60/874,585).

Figure 9:
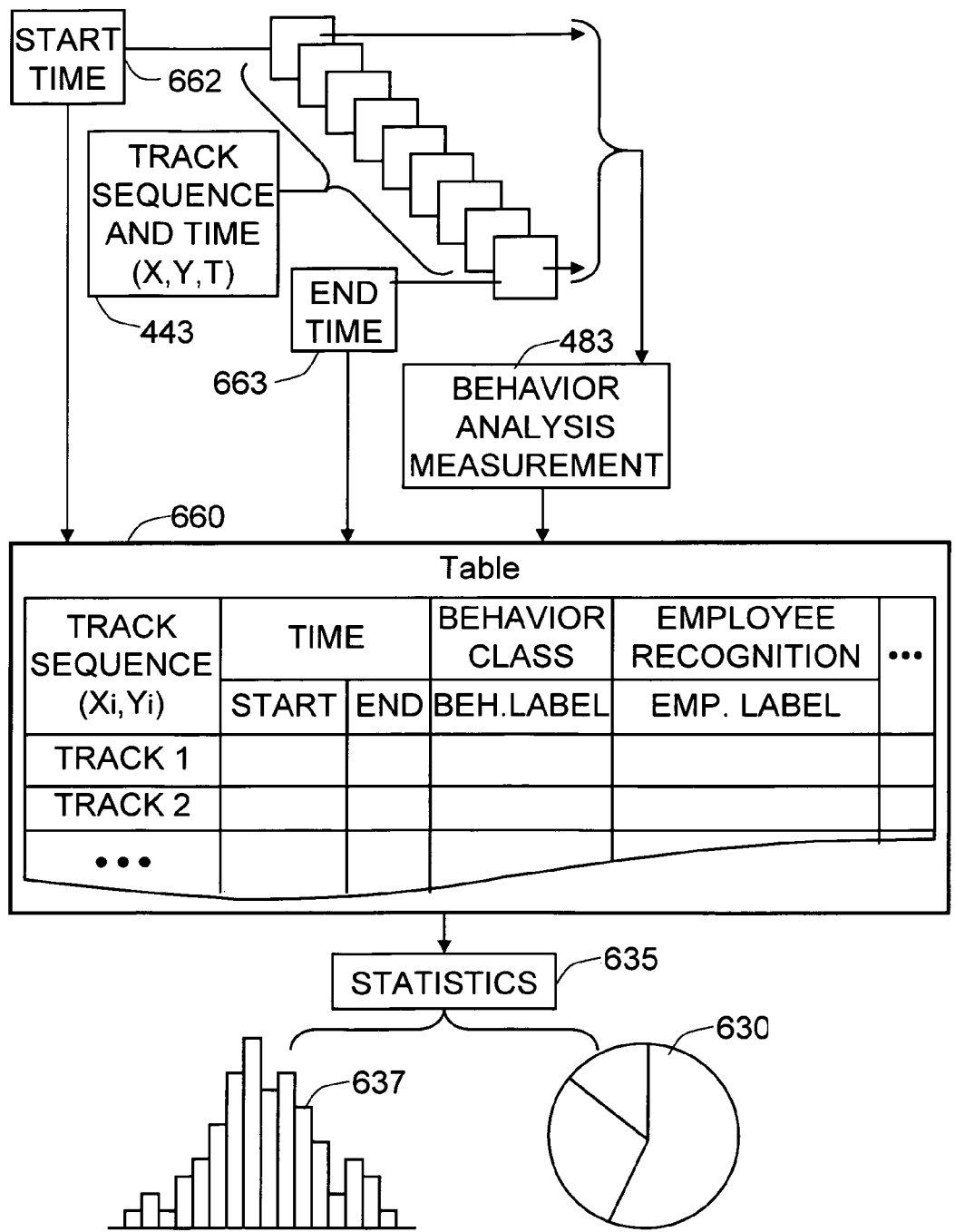
FIG. 9 shows an exemplary employee recognition data collection and storage process in an exemplary embodiment of the present invention.

FIG. 9 shows an exemplary employee recognition data collection and storage process in an exemplary embodiment of the present invention.

In the exemplary embodiment, the system can store the data in a table 660, where each track has fields of values: Exemplary attributes can be time stamps (start time 662 and end time 663 of the video-based tracking sequence 429), behavior class by the "behavior analysis measurement" 483 process, employee recognition labels, and so on.

The exemplary data can be used to collect statistics 635 of the behavior analysis of the employees and employee recognition labels. The statistics 635 can be represented as layers of information, map, table, pie chart 630, as bar graph 637, or any data representation means in the exemplary embodiment. The data is accessible by the programming module, so that the system can directly and automatically utilize the statistical data for the employee recognition.

Figure 10:
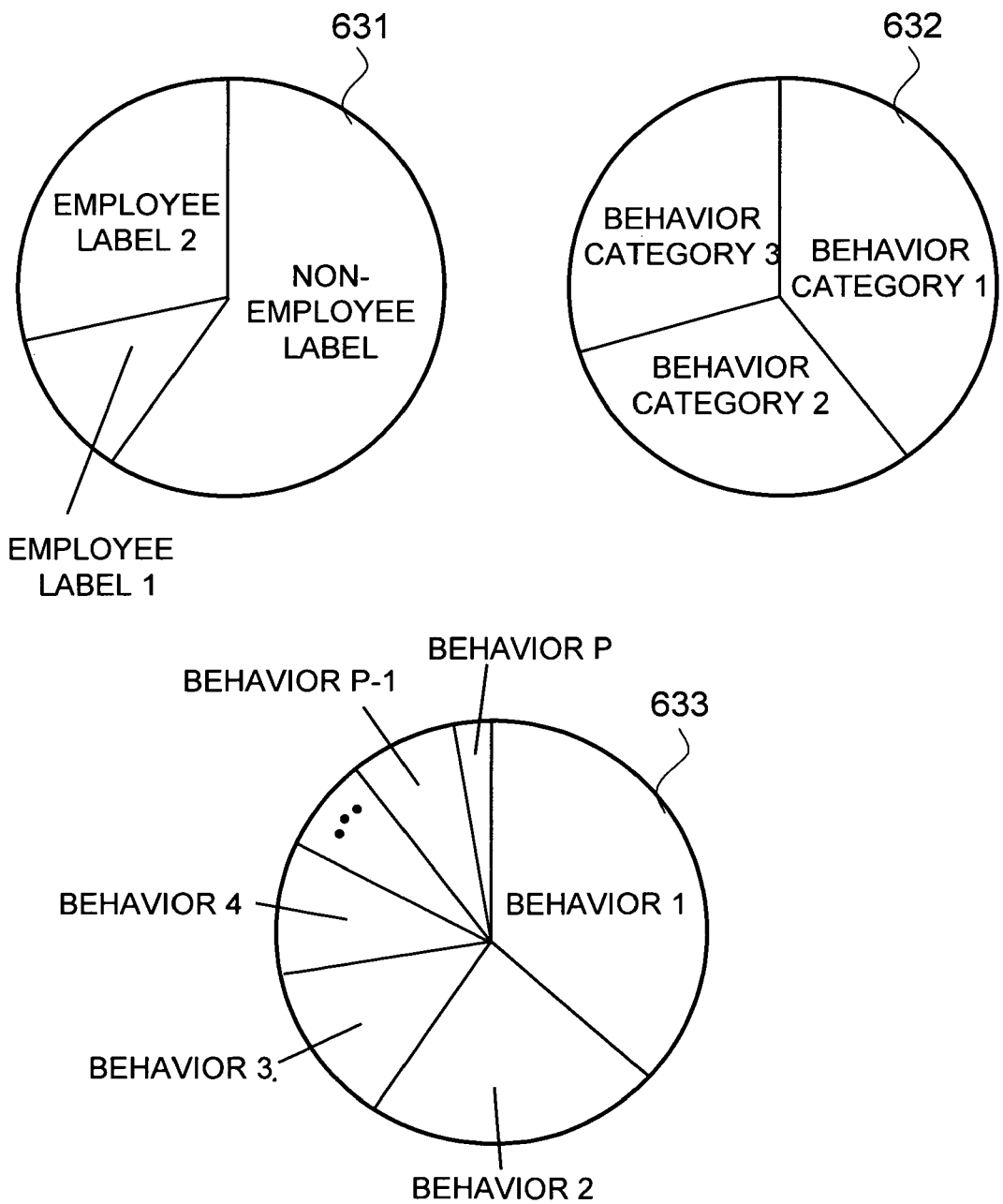
FIG. 10 shows exemplary pie charts of the exemplary employee recognition, where the pie charts provide useful employee recognition information to the decision maker, who owns an embodiment of the present invention, in a physical space.

FIG. 10 shows exemplary pie charts of the exemplary employee recognition, where the pie charts provide useful employee recognition information to the decision maker, who owns an embodiment of the present invention, in a physical space 130.

In the exemplary embodiment in FIG. 10, the exemplary "pie chart 1" 631 shows the percentage of the accumulated employee and non-employee recognition labels, "employee label 1", "employee label 2", and "non-employee label", which show an exemplary employee recognition data composition vs. non-employees in a physical space 130 during a predefined window of time. Other types of relevant information to the employee recognition can also be represented in the exemplary pie charts. The exemplary "pie chart 2" 632 divided the behavior patterns into three different behavior categories. The exemplary "pie chart 3" 633 further divided the behavior patterns into "behavior 1", "behavior 2", "behavior 3", "from behavior 4 to behavior P−1", and "behavior P". There can be multiple behavior levels between the "behavior 4" and the "behavior P−1".

In these exemplary pie charts, the relationship among the "pie chart 1" 631, the "pie chart 2" 632, and the "pie chart 3" 633 can be defined by the employee recognition criteria. For example, the employee recognition criteria can assign a "non-employee label" to "behavior 1" and "behavior 2" behavior patterns, "employee label 1" to "behavior 3" behavior pattern, and "employee label 2" to "from behavior 4 to behavior P−1" and "behavior P" behavior patterns in the behavior analysis, shown in the "pie chart 1" 631 and the "pie chart 3" 633.

The present invention enables the decision maker, who owns an embodiment of the present invention in a physical space 130, to query the statistical data, which is processed based on the actual measurement for the customers' shopping behaviors.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for recognizing a plurality of employees in a physical space based on behavior analysis of the people in said physical space, comprising the following steps of:
   a) capturing a plurality of input images of a plurality of persons by a plurality of means for capturing images in said physical space,
   b) processing said plurality of input images in order to track each person in said plurality of persons,
   c) processing behavior analysis of each person in said plurality of persons based on the tracking, and
   d) recognizing said plurality of employees by applying employee recognition criteria to the output of the behavior analysis for said plurality of persons,
   whereby said output of the behavior analysis comprises a sequence of visits or a combination of visits to a predefined category in said physical space by said plurality of persons.

2. The method according to claim 1, wherein the method further comprises a step of repeating the steps from a) to d) in claim 1 for a plurality of physical spaces in a network of the physical spaces.

3. The method according to claim 1, wherein the method further comprises a step of differentiating the levels of employee recognition, wherein first employee recognition criteria are applied to a group of employees and second employee recognition criteria are applied to another group of employees.

4. The method according to claim 1, wherein the method further comprises a step of processing the path analysis of each person in said plurality of persons for said behavior analysis, to distinguish employees from non-employees,
whereby attributes of said path analysis comprise information for initial point and destination, global trip, time, and average velocity.

5. The method according to claim 1, wherein the method further comprises a step of constructing the employee recognition criteria based on a set of predefined rules for employee recognition,
whereby a rule application logic module is utilized for applying the employee recognition criteria to the behavior analysis data.

6. The method according to claim 1, wherein the method further comprises a step of utilizing spatial rules as the employee recognition criteria,
whereby the spatial rules comprise at least one threshold for the frequency of tracking in a predefined place of said physical space.

7. The method according to claim 1, wherein the method further comprises a step of utilizing temporal rules as the employee recognition criteria,
whereby the temporal rules comprise at least one threshold for dwell time and average trip time in a specific place of said physical space.

8. The method according to claim 1, wherein the method further comprises a step of utilizing repetitive pattern of behavior as the employee recognition criteria,
whereby the repetitive pattern comprises repetitive trips between two points in said physical space.

9. The method according to claim 1, wherein the method further comprises a step of utilizing specific events in the physical space as the employee recognition criteria,
whereby behaviors driven by said specific event comprise a responsive behavior to an announcement for employees in said physical space.

10. The method according to claim 1, wherein the method further comprises a step of utilizing the relationship among the tracks of said plurality of persons as the employee recognition criteria,
whereby the relationship comprises one-to-many relationship over a period of time, in which one track interacts with multiple tracks.

11. The method according to claim 1, wherein the method further comprises a step of constructing said employee recognition criteria based on a combination of a set of predefined rules,
whereby population in said physical space can be divided into subpopulations by the combination of rules.

12. The method according to claim 1, wherein the method further comprises a step of constructing said employee recognition criteria based on application of a learning algorithm-based behavior analysis to the training population.

13. The method according to claim 12, wherein the method further comprises a step of utilizing distance measure and clustering for said learning algorithm-based behavior analysis.

14. The method according to claim 12, wherein the method further comprises a step of utilizing a Support Vector Machine (SVM) as said learning algorithm-based behavior analysis,
whereby learned features of the behavior comprise duration of dwell time, start, end, number of stops, location of stops, average length of stops, velocity change, repetition of location, displacement of stops, non-uniform pattern, percentage of time spent in a specific employee region, and color signature of tracks of said plurality of persons.

15. The method according to claim 1, wherein the method further comprises a step of constructing said employee recognition criteria based on example-based behavior analysis algorithm.

16. The method according to claim 1, wherein the method further comprises a step of applying different employee recognition criteria per each employee group,
whereby the application of different employee recognition criteria per each employee group makes deeper understanding of said each employee group possible.

17. The method according to claim 1, wherein the method further comprises a step of defining domain-specific criteria for said employee recognition criteria,
whereby a subset of the domain-specific criteria are constructed based on retail-specific rules.

18. An apparatus for recognizing a plurality of employees in a physical space based on behavior analysis of the people in said physical space, comprising:
a) means for capturing a plurality of input images of a plurality of persons by a plurality of means for capturing images in said physical space,
b) means for processing said plurality of input images in order to track each person in said plurality of persons,
c) means for processing behavior analysis of each person in said plurality of persons based on the tracking, and
d) means for recognizing said plurality of employees by applying employee recognition criteria to the output of the behavior analysis for said plurality of persons,
whereby said output of the behavior analysis comprises a sequence of visits or a combination of visits to a predefined category in said physical space by said plurality of persons.

19. The apparatus according to claim 18, wherein the apparatus further comprises means for repeatedly using the means from a) to d) in claim 1 for a plurality of physical spaces in a network of the physical spaces.

20. The apparatus according to claim 18, wherein the apparatus further comprises means for differentiating the levels of employee recognition,
wherein first employee recognition criteria are applied to a group of employees and second employee recognition criteria are applied to another group of employees.

21. The apparatus according to claim 18, wherein the apparatus further comprises means for processing the path analysis of each person in said plurality of persons for said behavior analysis, to distinguish employees from non-employees,
whereby attributes of said path analysis comprise information for initial point and destination, global trip, time, and average velocity.

22. The apparatus according to claim 18, wherein the apparatus further comprises means for constructing the employee recognition criteria based on a set of predefined rules for employee recognition,
whereby a rule application logic module is utilized for applying the employee recognition criteria to the behavior analysis data.

23. The apparatus according to claim 18, wherein the apparatus further comprises means for utilizing spatial rules as the employee recognition criteria,
whereby the spatial rules comprise at least one threshold for the frequency of tracking in a predefined place of said physical space.

24. The apparatus according to claim 18, wherein the apparatus further comprises means for utilizing temporal rules as the employee recognition criteria, whereby the temporal rules comprise at least one threshold for dwell time and average trip time in a specific place of said physical space.

25. The apparatus according to claim 18, wherein the apparatus further comprises means for utilizing repetitive pattern of behavior as the employee recognition criteria, whereby the repetitive pattern comprises repetitive trips between two points in said physical space.

26. The apparatus according to claim 18, wherein the apparatus further comprises means for utilizing specific events in the physical space as the employee recognition criteria, whereby behaviors driven by said specific event comprise a responsive behavior to an announcement for employees in said physical space.

27. The apparatus according to claim 18, wherein the apparatus further comprises means for utilizing the relationship among the tracks of said plurality of persons as the employee recognition criteria, whereby the relationship comprises one-to-many relationship over a period of time, in which one track interacts with multiple tracks.

28. The apparatus according to claim 18, wherein the apparatus further comprises means for constructing said employee recognition criteria based on a combination of a set of predefined rules, whereby population in said physical space can be divided into subpopulations by the combination of rules.

29. The apparatus according to claim 18, wherein the apparatus further comprises means for constructing said employee recognition criteria based on application of a learning algorithm-based behavior analysis to the training population.

30. The apparatus according to claim 29, wherein the apparatus further comprises means for utilizing distance measure and clustering for said learning algorithm-based behavior analysis.

31. The apparatus according to claim 29, wherein the apparatus further comprises means for utilizing a Support Vector Machine (SVM) as said learning algorithm-based behavior analysis, whereby learned features of the behavior comprise duration of dwell time, start, end, number of stops, location of stops, average length of stops, velocity change, repetition of location, displacement of stops, non-uniform pattern, percentage of time spent in a specific employee region, and color signature of tracks of said plurality of persons.

32. The apparatus according to claim 18, wherein the apparatus further comprises means for constructing said employee recognition criteria based on example-based behavior analysis algorithm.

33. The apparatus according to claim 18, wherein the apparatus further comprises means for applying different employee recognition criteria per each employee group, whereby the application of different employee recognition criteria per each employee group makes deeper understanding of said each employee group possible.

34. The apparatus according to claim 18, wherein the apparatus further comprises means for defining domain-specific criteria for said employee recognition criteria, whereby a subset of the domain-specific criteria are constructed based on retail-specific rules.

\* \* \* \* \*